United States Patent [19]

Niederprum

[11] Patent Number: 5,005,712
[45] Date of Patent: Apr. 9, 1991

[54] STORING AND TRANSPORTING RACK FOR BODY PANELS AND OTHER FLAT COMPONENTS

[75] Inventor: Klaus Niederprum, Bergheim, Fed. Rep. of Germany

[73] Assignee: Ford Motor Company, Dearborn, Mich.

[21] Appl. No.: 344,940

[22] Filed: Apr. 27, 1989

[30] Foreign Application Priority Data

Apr. 28, 1988 [DE] Fed. Rep. of Germany ....... 3714452

[51] Int. Cl.$^5$ .............................................. A47F 5/00
[52] U.S. Cl. ..................................... 211/150; 53/244; 211/41
[58] Field of Search ................. 211/41, 150, 59.459.3, 211/169.1; 414/331; 53/542, 443, 244

[56] References Cited

U.S. PATENT DOCUMENTS

| | | | |
|---|---|---|---|
| 1,135,215 | 4/1915 | Silvins | 211/169.1 |
| 1,275,983 | 8/1918 | Rasmussen | 211/150 |
| 1,790,468 | 1/1931 | Frank et al. | 108/38 |
| 2,675,133 | 1/1954 | Ostlund | 108/38 |
| 2,827,200 | 10/1956 | Lux | 211/150 X |
| 3,103,422 | 9/1963 | Green | 211/150 |
| 3,137,251 | 6/1964 | Pendergrast | 211/59.4 X |
| 3,143,087 | 8/1964 | Roddes | 211/150 X |
| 3,680,710 | 8/1972 | Hager | 211/24 |
| 3,762,572 | 10/1973 | Hager | 211/24 |
| 4,200,195 | 4/1980 | Hager | 211/24 |
| 4,355,974 | 10/1982 | Lee | 211/41 X |
| 4,359,162 | 11/1982 | Mayer et al. | 211/41 X |
| 4,572,382 | 2/1986 | Niederprum | 211/150 |
| 4,688,681 | 8/1987 | Bergeron | 211/36 |
| 4,712,691 | 12/1987 | Grill et al. | 211/150 X |

FOREIGN PATENT DOCUMENTS

| | | |
|---|---|---|
| 901040 | 1/1954 | Fed. Rep. of Germany . |
| 3333118 | 10/1986 | Fed. Rep. of Germany . |
| 0212528 | 12/1983 | Japan . |
| 735496 | 5/1980 | U.S.S.R. . |
| 1787 | of 1911 | United Kingdom . |

Primary Examiner—Carl D. Friedman
Assistant Examiner—Daniel Hulseberg
Attorney, Agent, or Firm—Randolph A. Smith; Roger L. May

[57] ABSTRACT

The present invention relates to a storage and transportation rack for stacking and transporting generally flat components, comprising a framework mechanism; a plurality of support columns attached to the framework mechanism, the support columns including bearing slots; and a plurality of support arm assemblies pivotally disposed in selected ones of the bearing slots of the support columns. The support arm assemblies are positionable between a rest position and an extended position so that when a support arm assembly is in the extended position, the support arm assembly supports at least a portion of the flat component. Further the support arm assemblies have a length and shape such that they can be positioned in the bearing slots which are at least one of adjacent to one another and spaced at least one bearing slot apart, whereby when a component is placed on one of the support arm assemblies, the support arm assembly is rotated from an intermediate position, which is between the rest and extended positions, to the extended position. During such movement a portion of the support arm assembly cooperates with a portion of the adjacent support arm assembly to move the adjacent support arm assembly from the rest position to an intermediate position capable of receiving the next component. Further, the support arm assemblies are adjustable in the bearing slots for allowing the rack to carry components of differing dimensions and the rack is designed so that the components can be transported horizontally, vertically or many other orientations.

17 Claims, 6 Drawing Sheets

STORING AND TRANSPORTING RACK FOR BODY PANELS AND OTHER FLAT COMPONENTS

BACKGROUND OF THE INVENTION

1. Field of the Invention

The present invention relates to a storing and transporting rack having folding shelves for the stacked reception of flat components such as body panels.

2. Discussion of the Related Art

A storing and transporting rack of this type is known from German patent document no. 3,333,118 to Niederprum, the instant inventor and this document corresponds to U.S. Pat. No. 4,572,382. This reference is directed to a storing and transporting rack for flat components. A plurality of supports are arranged vertically on a base pallet which is formed in a known manner for convenient handling by fork-lift trucks. When the rack is loaded with flat components, the individual support arms assume a substantially horizontal supporting position. Each shelf or support arm assembly includes a support part or arm, a pivot pin, a control arm, a counterweight, and a locking arm. As one flat component is loaded onto the rack, the support arm assembly is rotated and thus the control arm interacts with the control arm of the shelf located above and causes that shelf to be swung into an inclined or intermediate position for receiving the next component. This process continues as each successive flat component is added to the rack. Since this apparatus includes a counterweight, the rack is only able to reliably operate when it is oriented in one specific way. This rack cannot be oriented at an angle because otherwise reliable pivoting of the support arms between the respective rest position and the extended or supporting position and vice versa will not always be guaranteed. This means that the support arms could extend into the path of the work pieces to be placed on the rack and thus prevent proper loading of the rack.

Another problem with this rack is that there is no way for rigidly maintaining those shelves or support arm assemblies carrying flat components in the completely swung out or extended position without placing all of shelves in the completely extended position. This is because the frame has a locking part in the form of a locking bar which is displaceable parallel to the support and when the locking bar is in the stop position, the position of the locking arms and thus the support arm assemblies is ensured. To this end, the locking bar is arranged inside the profiled cross-section of the support in such a way that during the transfer to the locking position, the locking bar controls an outward pivoting of the support arms in cooperation with their respective locking arm, which previously occupied their rest position since there was not a flat component resting on the support arm. When the locking bar occupies the locking position, all the support arms are moved into their completely swung-out supporting position, irrespective of whether a flat component has been placed on the support arms or not. Certain drawbacks in handling this type of rack can result.

Further, this device does not allow for the adjustability of the shelves and therefore the rack cannot receive work pieces of differing dimensions. The support arms have a cost-effective design which is made of bent wire components of round material and is integral with the control and locking arms as well as with the pivot pins. It is not readily possible to increase the distance which the pivot pins are set apart in the bearing slots to twice or three times its value, since then the pivoting of the support arms out of the rest position into the intermediate position can no longer be controlled by the control arms.

SUMMARY OF THE INVENTION

The present invention seeks to provide a storing and transporting rack in which it is possible to stack flat components, which are of essentially similar format, independently of the orientation of the supports and therefore also independently of the supporting position of the support arms. This allows, for example, a horizontal arrangement of the supports in order to obtain a vertically oriented supporting position for the support arms.

The above and other objects of the present invention may be achieved by a storage and transportation rack for stacking and transporting generally flat components, comprising a framework means; a plurality of support columns attached to the framework means; a plurality of support arm assemblies mounted to the support columns, wherein each support arm assembly includes a support arm positionable between a rest position and an extended position such that when the support arm is in the extended position, the support arm supports at least a portion of the flat component; and a locking assembly means positionable between an operative and an inoperative position. The locking assembly means includes spring biased locking means for maintaining those of the support arms, which are positioned in the extended position, in the extended position when the locking assembly means is in the operative position.

The objects of the present invention can also be accomplished by a storage and transportation rack for stacking and transporting generally flat components, comprising a framework means; a plurality of support columns attached to the framework means; and a plurality of support arm assemblies pivotally disposed in selected ones of the bearing slots of the support columns. The support arm assemblies are positionable between a rest position and an extended position so that when the support arm assembly is in the extended position, the support arm assembly supports at least a portion of the flat component, and wherein the support arm assemblies have a length and shape such that they can be adjustably positioned in the bearing slots which are either adjacent to one another or spaced at least one bearing slot apart. When a component is placed on one of the support arm assemblies, the support arm assembly is rotated from an intermediate position, which is between the rest and the extended positions, to the extended position, and during this movement a portion of the support arm assembly cooperates with a portion of the adjacent support arm assembly to move the adjacent support arm assembly from the rest position to an intermediate position capable of receiving the next component.

According to the present invention, there is one return spring associated with each support arm assembly for prestressing the support arms into their respective rest position so that the support arm assemblies are pivoted independent of gravity. This allows the components to be positioned horizontally as well as in many other orientations. An improved operation of the locking arms is possible for securing the supporting position of the support arms, in such a way that the supporting position of a support arm can be directly secured by a single associated locking member. Additionally, it is now possible to make an arrangement where the support arms can be mounted between a minimum and a maximum mutual distance on the supports, so as to provide the rack with the ability of receiving flat components of widely differing design.

BRIEF DESCRIPTION OF THE DRAWINGS

The invention will now be described further, by way of example, with reference to the accompanying drawings, in which.

DESCRIPTION OF THE PREFERRED EMBODIMENTS

Figure 1:
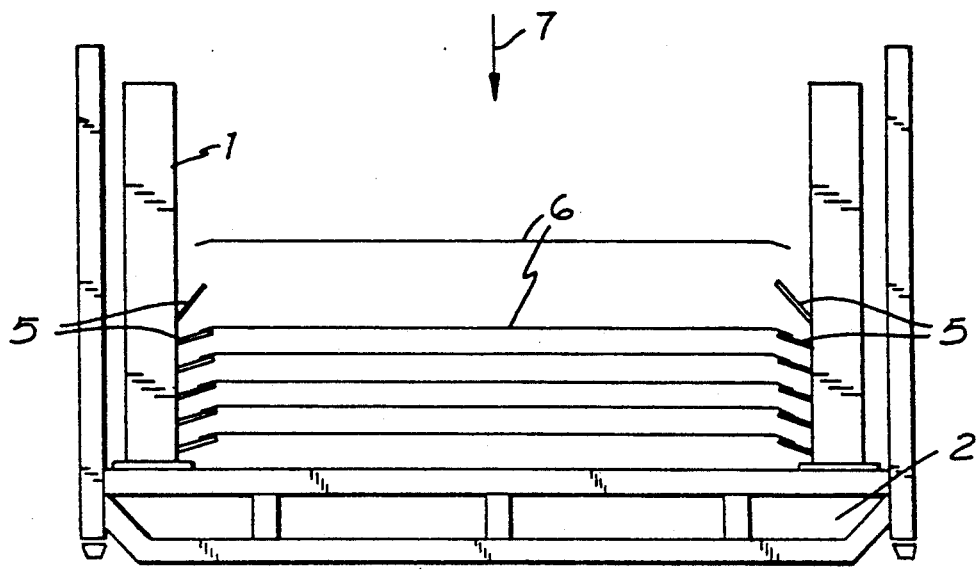
FIG. 1 is a side elevational view of one embodiment of the rack having vertical supports according to the present invention.
Figure 2:
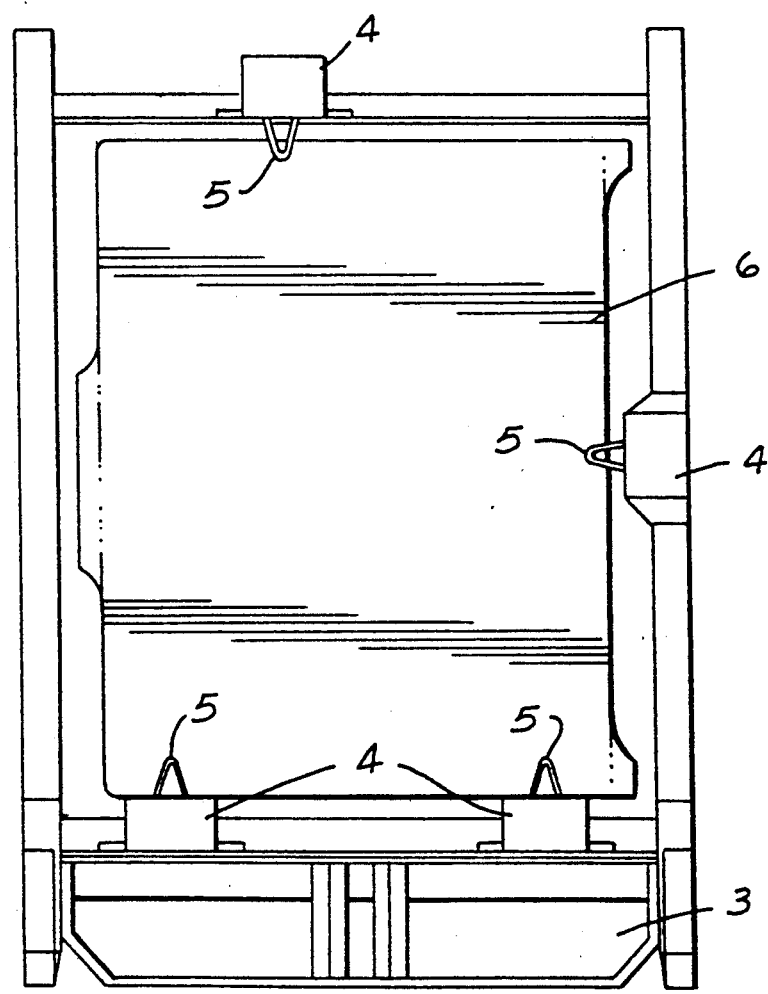
FIG. 2 is a side elevational view of another embodiment of the rack according to the present invention and this rack has a horizontal arrangement of the supports.

FIGS. 1 and 2 illustrate two different embodiments of a storing and transporting rack according to the present invention. They differ from each other essentially only in the arrangement of their individual supports or support columns 1 and 4 fixed to the framework or base in each case. Thus in FIG. 1, a plurality of individual supports 1 are vertically arranged on a framework or base 2 which may be designed in any desired manner. The rack of FIG. 2 includes a framework or base 3 which has a plurality of supports 4 horizontally arranged thereon. Common to both embodiments is that their supports 1, 4 are provided for pivotal mounting of a corresponding number of individual support arms 5. Each support arm 5 is pivotal from a swung-in or rest position into a swung-out supporting position by way of an intermediate position and when all of the support arms 5 are in the swung-out position they are spaced a corresponding distance apart along the support columns 1 and 4. The intermediate position is defined such that when a flat component 6 is added to rack, the flat component 6 will contact those support arms 5 which are positioned in the intermediate position. The arrow 7 in FIG. 1 indicates the direction in which the flat components 6 are individually and successively placed on the support arms 5 which have been pivoted into the intermediate position. As the flat components 6 are placed onto the support arms 5 they pivot the support arms 5, under the respective loading of the flat component 6, into a completely swung-out supporting position, while at the same time, there is an interaction with the adjacent support such that it is moved from a rest position into an intermediate position. This operation will be further described below. In FIG. 2, the direction of movement of the flat components 6 is at right angles to the plane of the drawing and therefore the direction of movement of the flat components 6 is parallel to the longitudinal axis of the supports 4. This direction of movement can be seen by the arrow 8 in FIG. 4.

Figure 3:
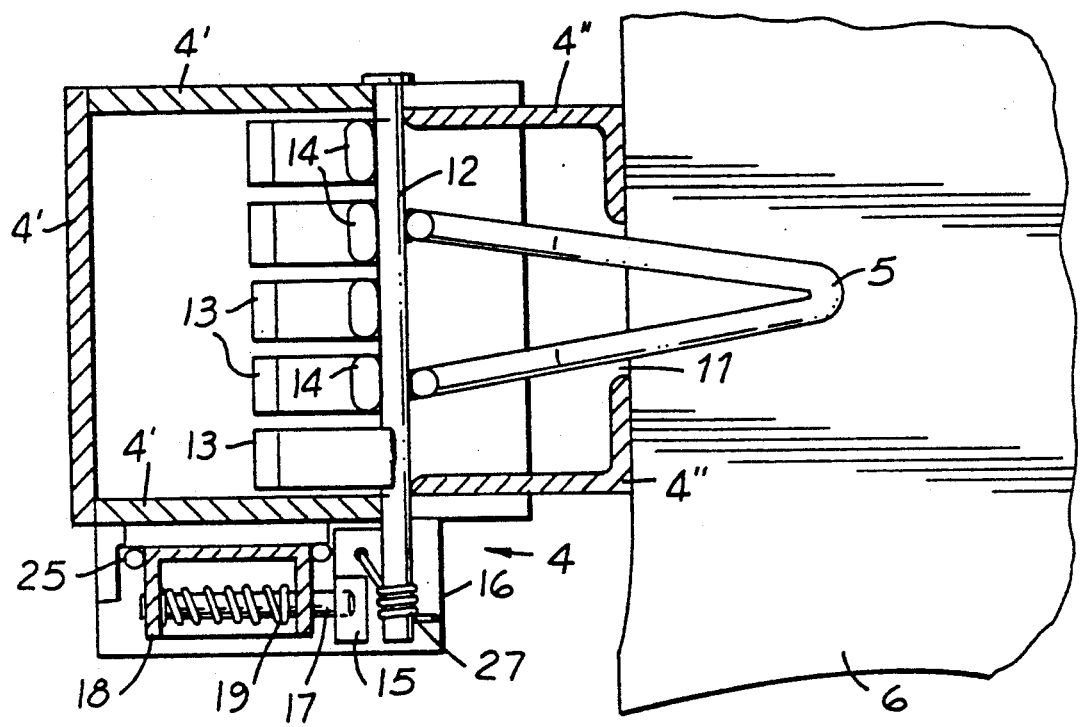
FIG. 3 is a sectional side elevational view of a support in the rack of FIG. 2, taken in the middle of the support, according to the present invention.

FIG. 3 discloses the details of the cross section of one of the lower supports 4 shown in FIG. 2. Specifically the support 4 is made up of individual plates 4' and angle sections 4". Bearing slots 28 (shown in FIGS. 4, 11 and 12) are formed in the angle sections 4" and can receive the support arm assemblies therein. The angle sections 4" of the supports 4 located along the lower frame piece are provided for contacting and supporting the flat components 6. A slot opening 11 is also provided between the angle sections 4" so that the support arms 5 can project outwardly from the support 4 in order to occupy their intermediate and swung-out or extended positions.

Figure 4:
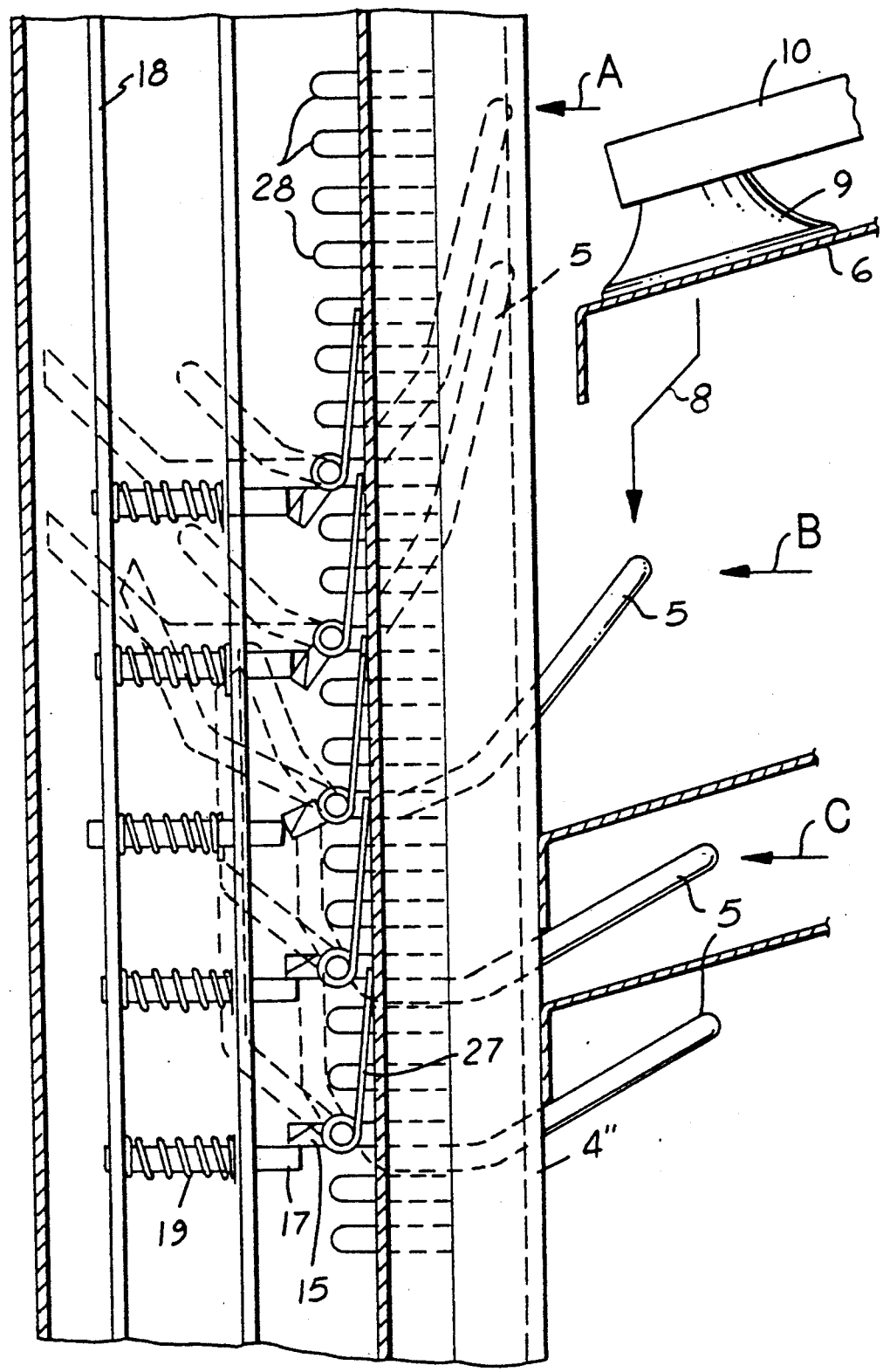
FIG. 4 is another side elevational view, partly in section, of a support of the rack of FIG. 2 according to the present invention. This figure illustrates that the different pivot positions of the support arm assemblies are dependent upon loading with a flat component.

FIG. 4 illustrates the flat components 6 being conveyed for a stack-like reception in the rack. This can be accomplished by for example suction gripping devices such as the suction device 10 which operates in conjunction with adhesion suckers or suction cups 9 (only one being illustrated).

Figure 5:
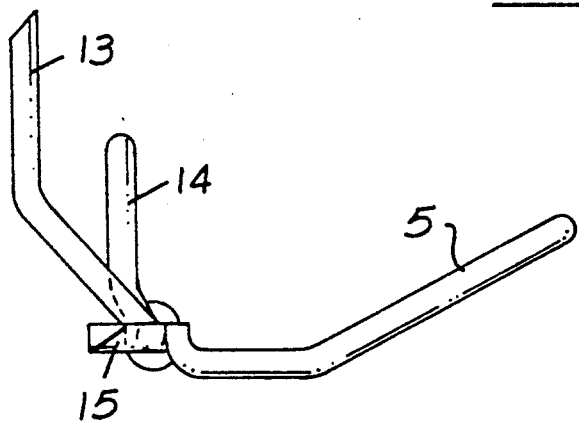
FIGS. 5 and 6 are side elevational views of the support arm assemblies according to the present invention.
Figure 6:
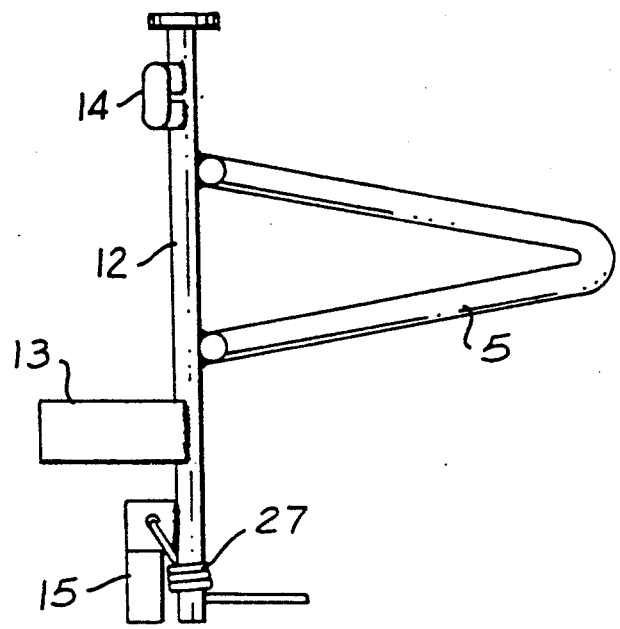

Each support arm 5 comprises a length of round material which is bent into a V shape and which is either welded at its ends to a pivot pin 12 or is formed integral therewith, see FIGS. 5 and 6. In addition to the support arm 5, an angled control arm 13, an adjusting arm 14 which is shorter than the control arm 13 and a locking arm 15, are welded to the pivot pin 12. The locking arm 15 is disposed on the side of the pivot pin 12 which is remote from the support arm 5. Of all the arms attached to the pivot pin 12, only the locking arm 15, which is attached near one end of the pivot pin 12, is axially positioned outside of the individual plates 4' of support 4. On the other hand, the control arms 13 and the adjusting arms 14 are arranged inside the individual plates 4' and the angle sections 4" and they are angularly staggered and axially offset from one another in the axial direction of the pivot pin 12, see FIG. 3.

In FIGS. 3 and 6 it can be seen that the control arm 13 and the adjusting arm 14 are welded to the pivot pin 12. FIG. 3 also shows that the locking arm 15 which is attached to the pivot pin 12 is arranged inside a housing cover 16. A locking assembly, which is located outside of the profiled cross section of the support 4 (i.e. outside of the individual plates 4' and the angle sections 4") and which includes individual locking pins 17, a locking rail 18 disposed in a guide 25, and individual springs 19 disposed around the locking pins 17 is covered by the housing cover 16. The locking pins 17 are arranged in the common locking rail 18 and are prestressed in each case by a respective spring 19. The common locking rail 18 is a single rail which holds a plurality of locking pins 17 which are movable transverse to the longitudinal axis of the locking rail 18.

Figures 7, 8:
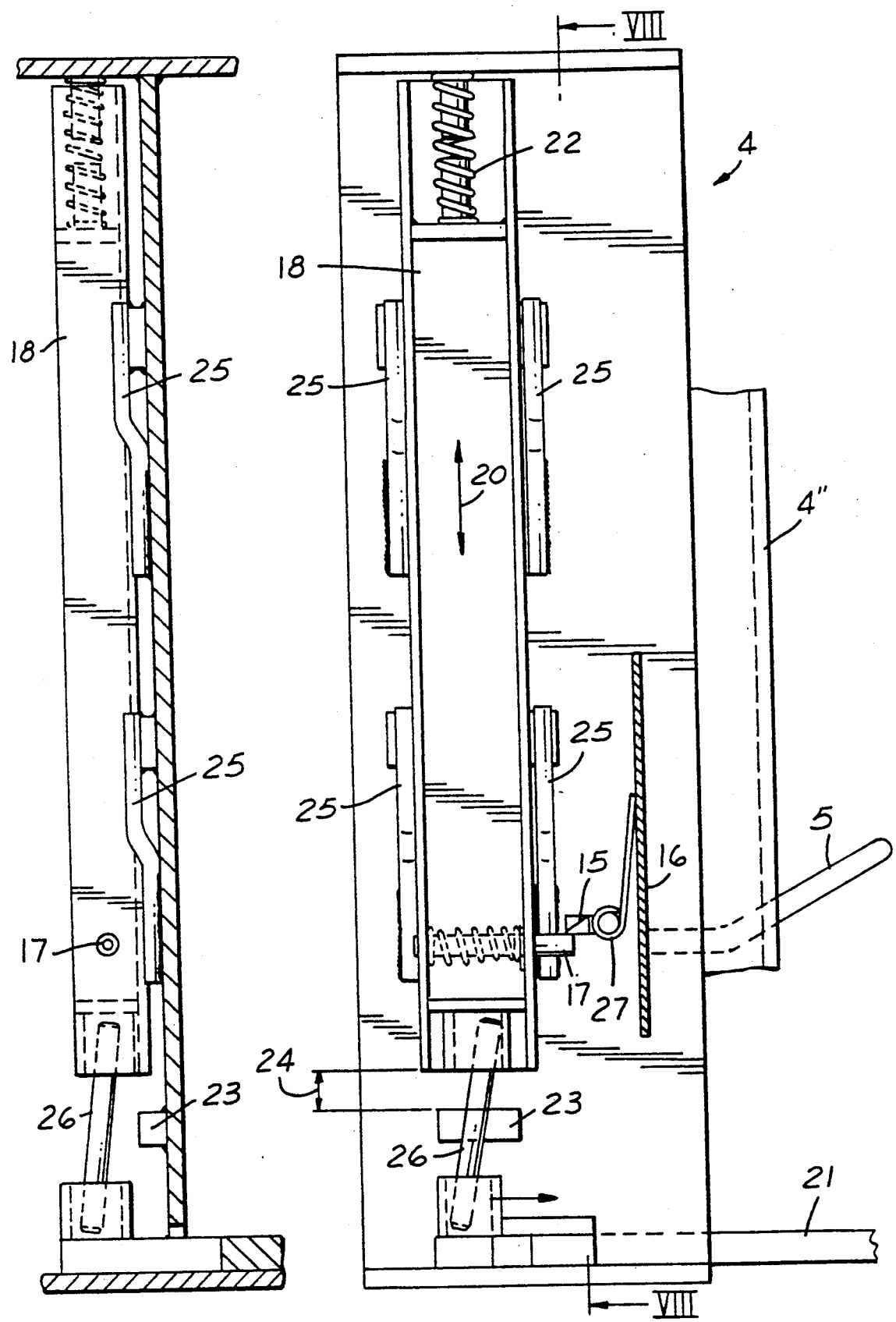
FIG. 7 is side elevational view of a support corresponding to FIG. 4 and it illustrates a locking rail in its locking position.
FIG. 8 is a sectional side elevational view of the support taken along line VIII—VIII of FIG. 7.
Figure 10:
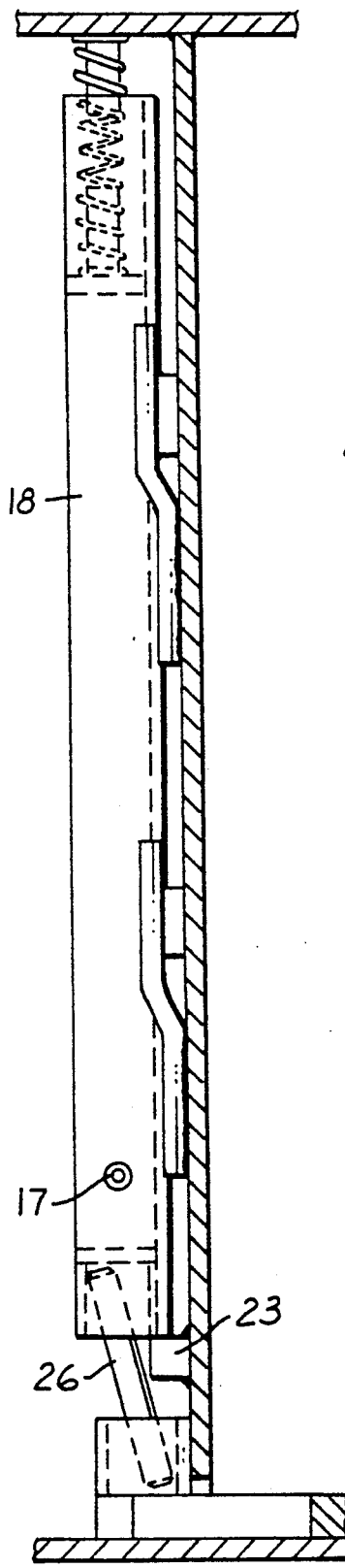
FIG. 10 is a sectional side elevational view of the support taken along line X—X of FIG. 9.
Figure 9:
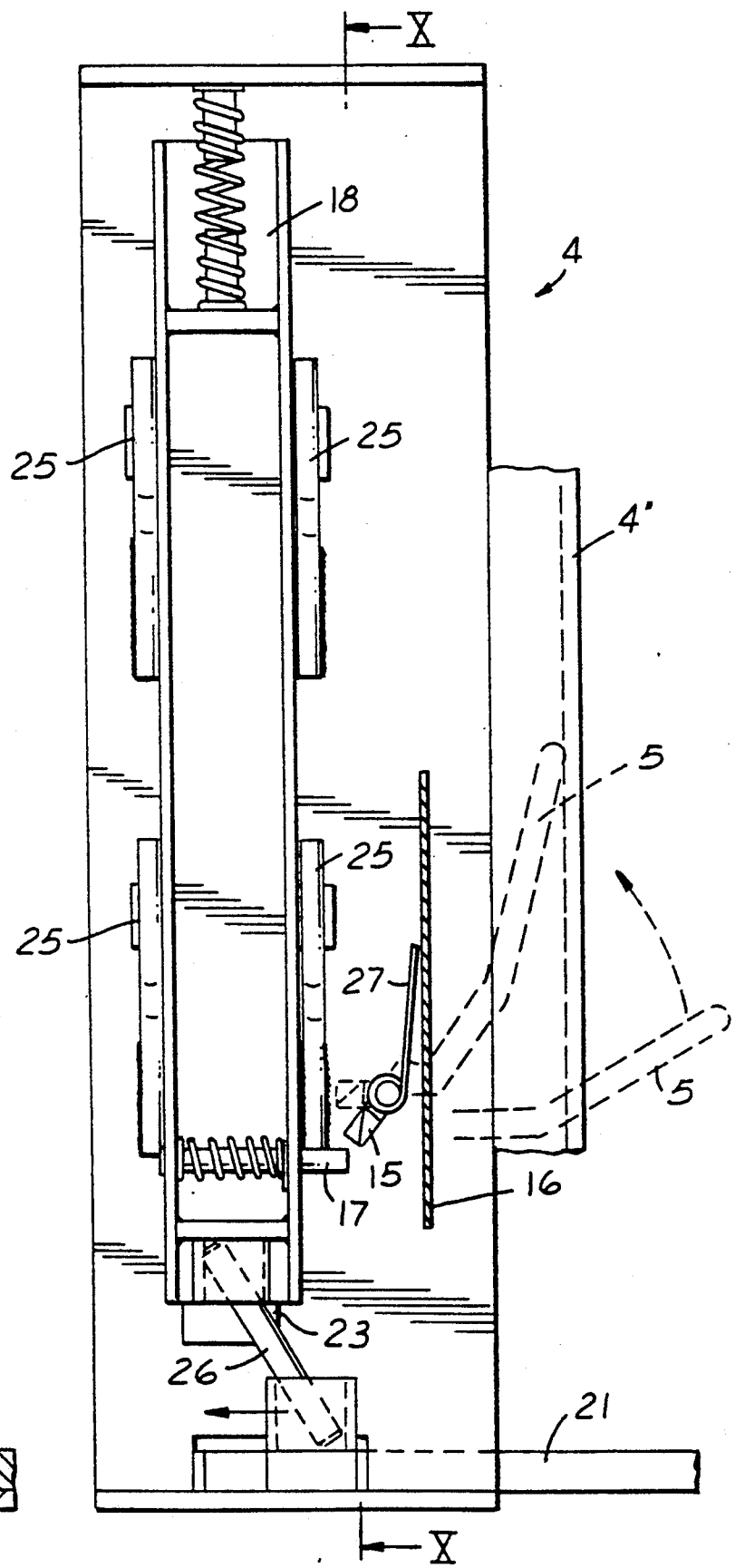
FIG. 9 is a side elevational view of a support similar to that shown in FIG. 7 however illustrating the locking rail in its initial position whereby the support arms can swing back into their rest position.

The locking rail 18 is movable in the direction of the double arrow 20 shown in FIG. 7 by actuating a handle 21. FIGS. 7 and 8 illustrate the locking rail 18 in its relative locking or operative position and FIGS. 9 and 10 illustrate the locking rail 18 in its initial or inoperative position. The locking rail 18 is prestressed by the force of a return spring 22 such that in the inoperative position, the locking rail 18 abuts a stop 23. When the handle 21 is actuated it transfers the movement through an actuating pin 26 to the locking rail 18. Then the locking rail 18 is guided linearly through a guide 25 which is rigidly attached to the frame. As the locking rail 18 is moved by handle 21 and the actuating pin 26, the force exerted on the locking rail 18 overcomes the force of the return spring 22. The displacement distance 24, illustrated in FIG. 7, between the stop 23 and the edge of the locking rail 18 is needed to permit the support arms 5 to swing into their rest position. This pivoting or swinging back to the rest position is effected by a spring 27 which, according to FIG. 3, engages the locking arm 15 of the associated support arm 5. In FIGS. 7 to 10, only one locking arm 15 of an associated support arm 5 is shown here for the locking rail 18 however additional locking pins and additional support arms are contemplated and some of these are indicated by center lines in these figures.

Figure 11:
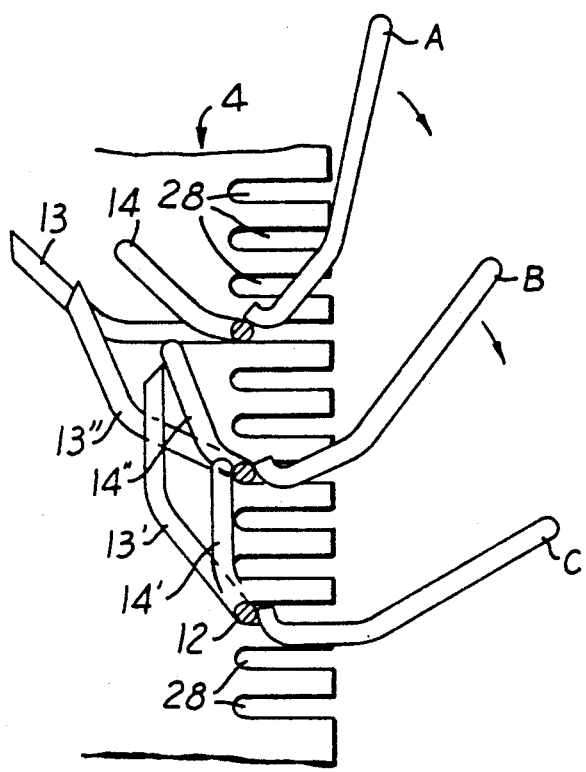
FIGS. 11 and 12 are detailed side elevational views illustrating the support arm assemblies spaced a maximum and a minimum distance apart on the bearing support for that particular design of support arm assembly.
Figure 12:
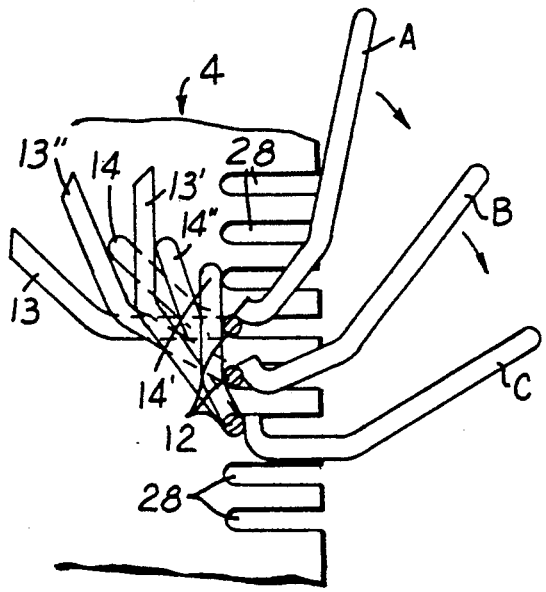

The movement of how each individual support arm assembly is swung from its swung in or rest position A by way of an intermediate position B into a completely swung out or extended position C is shown in FIGS. 4, 11 and 12. When a flat component 6 is conveyed by means of the suction gripping device 10 in the direction of arrow 8 for reception in the rack, it will initially come into contact with the support arms 5 which are located in the intermediate position B. By becoming loaded with the flat component 6, the support arms 5 are then swung into the supporting or extended position C. As the support arm 5 is rotated, the pivot pin 12 and thus the control arm 13 are also rotated and then the control arm 13 acts upon the adjusting arm 14 of the next support arm assembly thereby bringing that support arm assembly's support arm 5 into the intermediate position B against the force of the associated return spring 27. As soon as the support arm 5 loaded with the flat component 6 has occupied its supporting or extended position C, the locking arm 15 and thus the entire support arm assembly is secured by the cooperation of an associated locking pin 17 assuming the locking rail 18 is positioned in its operative position. Therefore it can be understood that as the support arm assembly is moved into the completely extended position C, the ramp-like actuating surface of the locking arm 15 (seen in FIGS. 4, 5, 7 and 9) moves the locking pin 17 against the force of the spring 19 until it overcomes this "catch" and the locking pin 17 is then able to return to its extended position whereby it maintains the support arm assembly in its completely extended position C. This also means that the adjacent adjusting arm 14 and the entire associated support arm assembly assumes a stop position such that the support arm 5 of that assembly is maintained in the intermediate position B awaiting the next flat component 6.

It is possible for the support arm assemblies to be positioned in bearing slots 28 of the supports 1, 4 such that they can accommodate flat components 6 of differing dimensions, see FIGS. 11 and 12. Depending on the exact shape and length of the control arms 13 and the adjusting arms 14, it is possible to obtain proper operation of the support arm assemblies when the pivot pins 12 are located in adjacent bearing slots 28 such as shown in FIG. 12 or when then the pivot pins 12 are spaced apart by at least one bearing slot 28. FIG. 11 illustrates an example of the maximum spacing for the particular control arms 13 and adjusting arms 14 shown. In this example the pivot pins 12 are disposed in every third bearing slot 28. However it is to be understood that many different spacing arrangements are possible and these just depend on the particular sizes and shapes of the control arms 13 and the adjusting arms 14. It should be realized that whatever size and shape is selected for the control arms 13 and the adjusting arms 14, they should still be arranged in an angularly staggered and axially offset manner such as that shown in FIG. 3.

Figure 13:
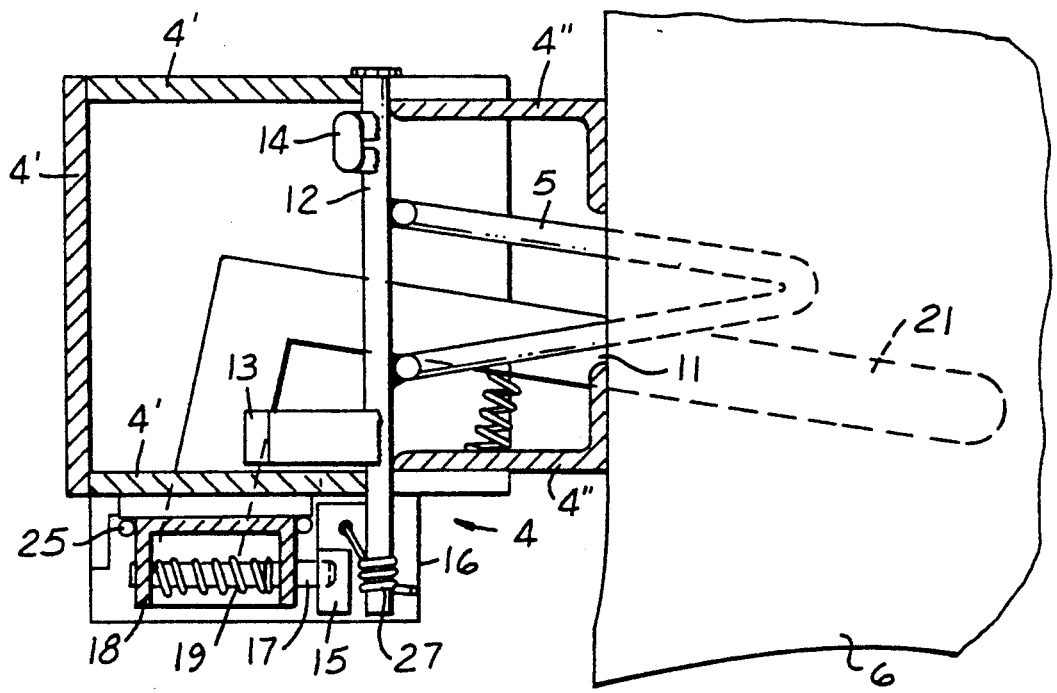
FIG. 13 is a sectional side elevational view of a support disposed in the rack of FIG. 2 specifically illustrating the handle for moving the locking rail according to the present invention.

FIG. 13 illustrates the handle 21 and the support arm assembly located adjacent thereto with the support arm 5 positioned in the extended position while it supports a flat component 6.

The present invention has been described with reference to certain preferred embodiments and those skilled in the art, in view of the present disclosure, will appreciate that numerous alternative embodiments of the invention are within the scope of the following claims.

What is claimed is:

1. A storage and transportation rack for stacking and transporting generally flat components, comprising:
    a framework means;
    a plurality of support columns attached to said framework means, said support columns including bearing slots;
    a plurality of support arm assemblies pivotally disposed in selected ones of said bearing slots of said support columns, wherein each said support arm assembly includes a pivot pin receivably disposed in said bearing slot, a control arm attached to said pivot pin, an adjusting arm attached to said pivot pin such that said support arm assemblies are positionable between a rest position and an extended position so that when said support arm assembly is in said extended position, said support arm supports at least a portion of the flat component; and
    wherein said control arms and said adjusting arms have a length and shape such that said support arm assemblies can be adjustably positioned within a range of adjacent bearing slots allowing storage of flat components of varying size, without disturbing the sequencing ability of said support arm assemblies and wherein such sequencing in such that when a component is placed on said support arm of one of said support arm assemblies, said support arm assembly is rotated from an intermediate position, which is between said rest and said extended positions, to said extended position, and such that during such movement said control arm of said support arm assembly cooperates with an adjusting arm of the adjacent support arm assembly to move the adjacent support arm assembly from said rest position to an intermediate position capable of receiving the next component.

2. A storage and transportation rack as defined in claim 1, wherein said support arm assembly further comprises a spring means attached to said pivot pin for normally biasing said support arm assembly in said rest position.

3. A storage and transportation rack as defined in claim 2, further comprising means for selectively preventing movement of said support arm assembly to said rest position when said support arm assembly is in said extended position.

4. A storage and transportation rack as defined in claim 3, wherein said means for selectively preventing movement is shiftable along a longitudinal axis of said support column between a first position where said means for selectively preventing movement can contact said support arm assembly and a second position where said support arm assembly can return to said rest position.

5. A storage and transportation rack as defined in claim 2, further comprising:
a locking assembly means positionable between an operative and an inoperative position, said locking assembly means including spring biased locking means for maintaining those of said support arms, which are positioned in said extended position, in said extended position when said locking assembly means is in said operative position.

6. A storage and transportation rack as defined in claim 1, further comprising:
a locking assembly means positionable between an operative and an inoperative position said locking assembly means including spring biased locking means for maintaining those of said support arms, which are positioned in said extended position in said extended position when said locking assembly means is in said operative position.

7. A storage and transportation rack as defined in claim 6, wherein said support arm assembly further includes a locking arm attached to said pivot pin and where said locking assembly means is positioned in said operative position, said locking means is disposed in a pivot path of said locking arm.

8. A storage and transportation rack as defined in claim 7, wherein said locking arm and a portion of said pivot pin are disposed outside of said support column.

9. A storage and transportation rack as defined in claim 6, wherein said locking assembly means further comprises a common locking rail oriented parallel to said support columns and spring biased locking pins attached in said common locking rail.

10. A storage and transportation rack as defined in claim 1, wherein said control arms of adjacent support arm assemblies are angularly staggered and axially offset from one another.

11. A storage and transportation rack as defined in claim 1, wherein said adjusting arms of adjacent support arm assemblies are angularly staggered and axially offset from one another.

12. A storage and transportation rack for stacking and transporting generally flat components, comprising:
a framework means;
a plurality of support columns attached to said framework means, said support columns including bearing slots;
a plurality of support arm assemblies pivotally disposed in selected ones of said bearing slots of said support columns, said support arm assemblies being positionable between a rest position and an extended position so that when said support arm assembly is in said extended position, said support arm assembly supports at least a portion of the flat component, and wherein said support arm assemblies have a length and shape such that they can be adjustably positioned within a range of bearing slots allowing storage of flat components of varying size without disturbing the sequencing ability of said support arm assemblies and wherein such sequencing is such that when a component is placed on one of said support arm assemblies, said support arm assembly is rotated from an intermediate position, which is between said rest and said extended positions, to said extended position, and such that during such movement a portion of said support arm assembly cooperates with a portion of the adjacent support arm assembly to move the adjacent support arm assembly from said rest position to an intermediate position capable of receiving the next component.

13. A storage and transportation rack as defined in claim 12, further comprising:
a locking assembly means positionable between an operative and an inoperative position, said locking assembly means including spring biased locking means for maintaining those of said support arms, which are positioned in said extended position, in said extended position when said locking assembly means is in said operative position.

14. A storage and transportation rack as defined in claim 12, further comprising means for selectively preventing movement of said support arm assembly to said rest position when said support assembly is in said extended position.

15. A storage and transportation rack as defined in claim 14, wherein said means for selectively preventing movement is shiftable along a longitudinal axis of said support column between a first position where said means for selectively preventing movement can contact said support arm assembly and a second position where said support arm assembly can return to said rest position.

16. A storage and transportation rack as defined in claim 12, wherein at least some of said support arm assemblies are spaced more than one bearing slot apart.

17. A storage and transportation rack for stacking and transporting generally flat components, comprising:
a framework means;
a plurality of support columns attached to said framework means, said support columns including bearing slots;
a plurality of support arm assemblies pivotally disposed in selected ones of said bearing slots of said support columns, said support arm assemblies being positionable between a rest position and an extended position so that when said support arm assembly is in said extended position, said support arm assembly supports at least a portion of the flat component, and wherein said support arm assemblies have a length and shape such that they can be adjustably positioned, within a range of said bearing slots which are either adjacent to one another or spaced at least one bearing slot apart, allowing storage of flat components of varying size without disturbing the sequencing ability of said support arm assemblies and wherein such sequencing is such that when a component is placed on one of said support arm assemblies, said support arm assembly is rotated from an intermediate position, which is between said rest and said extended positions, to said extended position, and such that during such movement a portion of said support arm assembly cooperates with a portion of the adjacent support arm assembly to move the adjacent support arm assembly from said rest position to an intermediate position capable of receiving the next component.

* * * * *